United States Patent

Forman et al.

[15] 3,654,434

[45] Apr. 4, 1972

[54] PHOTO SENSOR ARRAY CHECKING METHOD AND APPARATUS

[72] Inventors: Herbert W. Forman, Falmouth; Everett W. Muse, Burlington, both of Mass.

[73] Assignee: Honeywell Inc., Minneapolis, Minn.

[22] Filed: June 16, 1970

[21] Appl. No.: 46,715

[52] U.S. Cl. .................................... 235/61.11 E, 250/219 D
[51] Int. Cl. .................................... G06k 7/016
[58] Field of Search .......................... 178/17 D, 69 G, 23 A; 235/61.11 E, 61.11 A, 61.11 B, 61.11 C; 250/219 D, 219 DC, 219 DF; 324/21

[56] References Cited

UNITED STATES PATENTS

| | | | |
|---|---|---|---|
| 3,361,896 | 1/1968 | Antonio | 235/ 61.11 E |
| 3,480,762 | 11/1969 | Del Vecchio | 235/61.11 E |
| 3,173,000 | 3/1965 | Johnson et al. | 235/61.11 E |
| 3,365,714 | 1/1968 | Timares et al. | 250/219 D |

*Primary Examiner*—Thomas A. Robinson
*Attorney*—Fred Jacob and Leo Stanger

[57] ABSTRACT

In a mark sense card reader having photo detectors and photo amplifiers, a system for checking the operation of all channels of the device by reading a dark, then light portion on the leading edge of a card to be read, in order to allow sensed data to be strobed from a register to an external device.

10 Claims, 5 Drawing Figures

PATENTED APR 4 1972 3,654,434

SHEET 1 OF 4

INVENTORS
HERBERT W. FORMAN
EVERETT W. MUSE
BY Anthony J. Sarli, Jr.
ATTORNEY

INVENTORS
HERBERT W. FORMAN
EVERETT W. MUSE
BY
Anthony J. Sarli, Jr.
ATTORNEYS

INVENTORS
HERBERT W. FORMAN
EVERETT W. MUSE
BY Anthony J. Sarli, Jr.
ATTORNEYS

INVENTORS
HERBERT W. FORMAN
EVERETT W. MUSE
BY
ATTORNEYS

PHOTO SENSOR ARRAY CHECKING METHOD AND APPARATUS

BACKGROUND OF THE INVENTION

The present invention relates generally to card readers and more particularly to mark sense card readers of the type in which a card with a plurality of columns and rows of spaces is provided, the columns representing data words and the rows representing individual digits of the data word. In such devices, a plurality of light sensitive components are utilized; one for each row of the card. Sensed light is reflected from a light source by the card onto photosensitive devices, whose outputs are amplified and shaped into a group of pulses representing data words for further use by an external device such as a data processing unit.

DESCRIPTION OF THE PRIOR ART

In the past, devices have been proposed which sense the threshold of a light sensing device output or the output of its associated amplifier, and adjust the gain of the amplifier to provide a standard signal level output. Other devices have been proposed which are used to sense the beginning or the end of a card by means of holes in the card or a reflective or non-reflective portion of the card in order to set the card reading logic to properly interpret the sensed markings.

SUMMARY OF THE INVENTION

The present invention relates to a system which automatically checks for the proper operation of all channels and their associated photosensitive devices and amplifiers, by providing a gray or black line on the leading edge of the mark sense card which may indicate the minimum change in intensity to be sensed by each channel of the card reader. If a failure of this check occurs, data transfer pulses will not be generated. Additionally, following the marginal intensity check, a light check is performed to arm the device to become activated with the first clock pulse following. A failure of this check will also inhibit the transfer of pulses generated. Information generated is temporarily stored in a buffer; and upon application of a transfer pulse is outputed to the output utilization device.

OBJECTS

It is an object of the instant invention to provide an improved pulse generation system for use with card readers.

A further object of the invention is to provide a means for checking the operation of all channels of a card reader.

A further object of the invention is to provide an improved pulse transfer arrangement whereby data may not be transferred if any of the associated sensing channels are in error.

The foregoing and other objects and advantages of the instant invention will become apparent from the following description of the preferred embodiment when read in conjunction with the drawings contained herewith.

FIGS. *2a* and *2b* are logic block diagrams of the operative error checking and data strobing portions of a card reader according to the invention.

Figure 3:
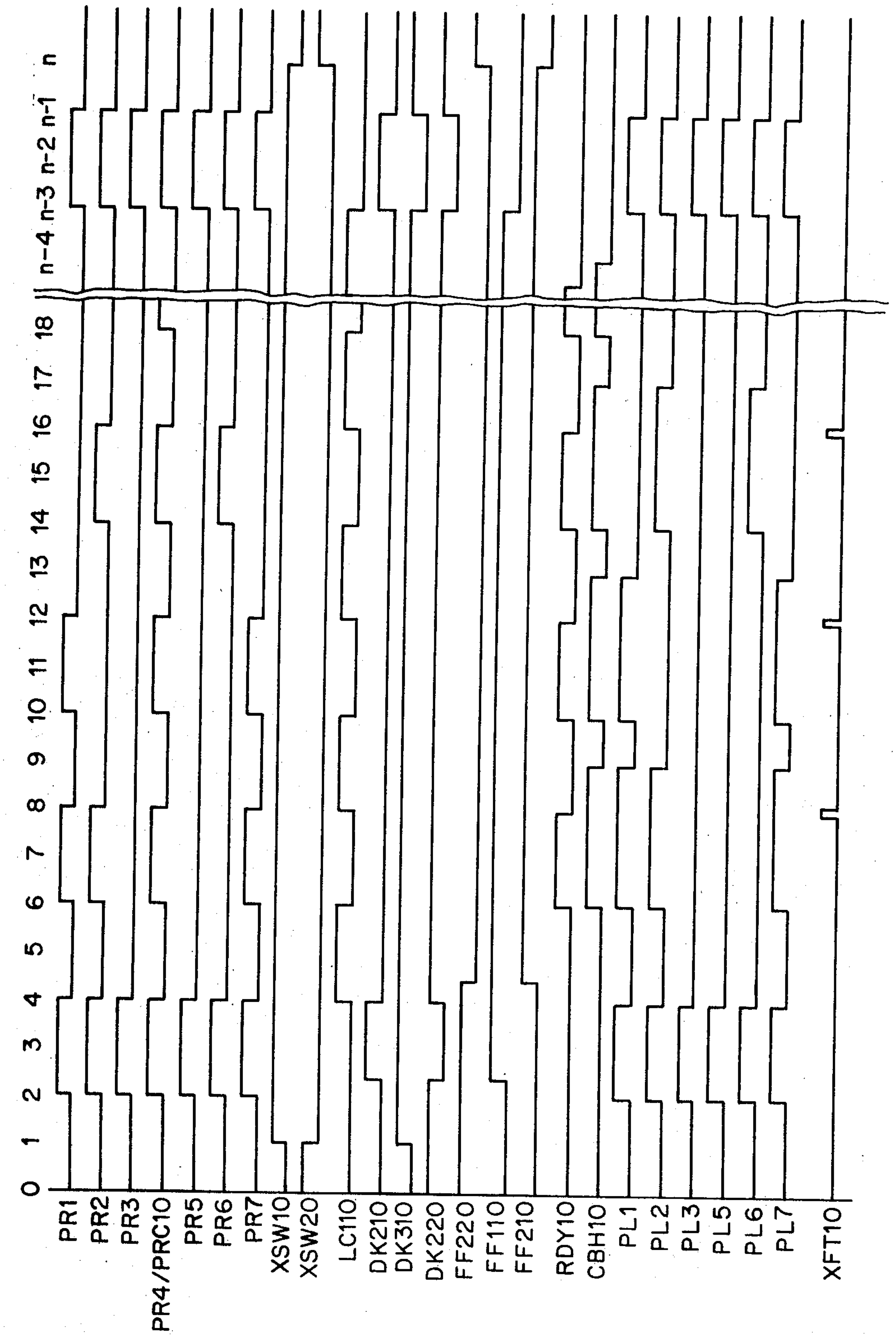

FIG. 3 is a timing diagram setting forth the operative relationships of the generated signals of the system.

Figure 4:
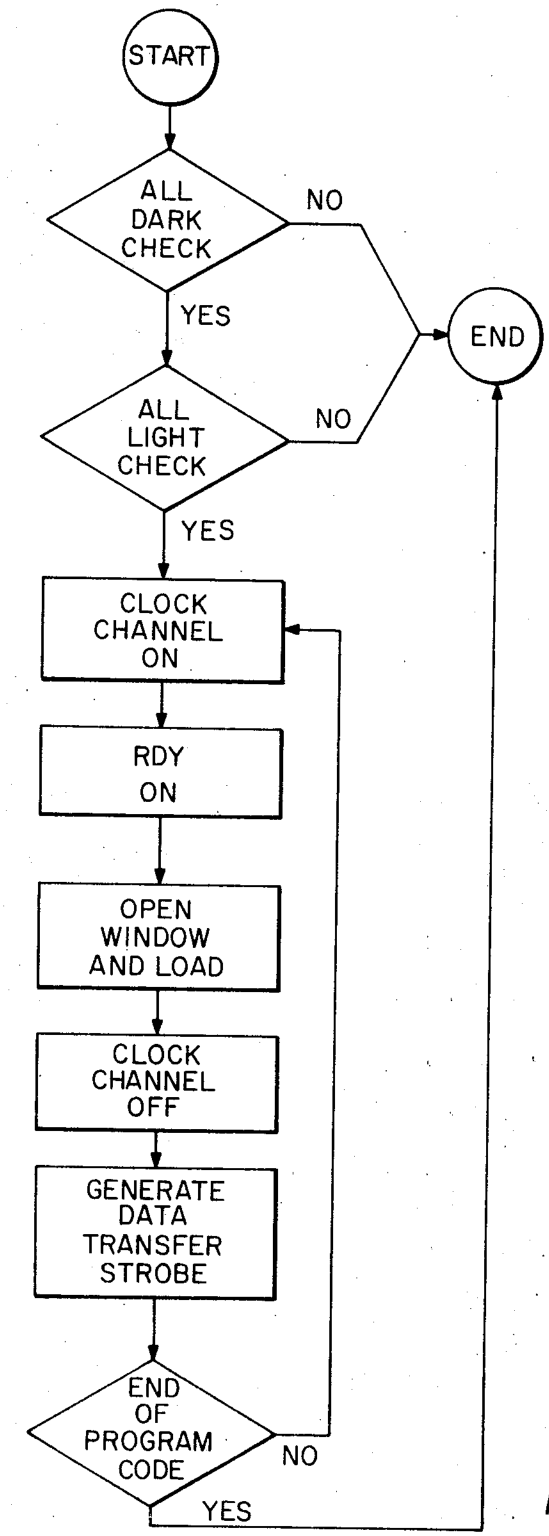

FIG. 4 is a flow diagram showing the overall operation of the invention.

DESCRIPTION OF THE PREFERRED EMBODIMENT

Figure 1:
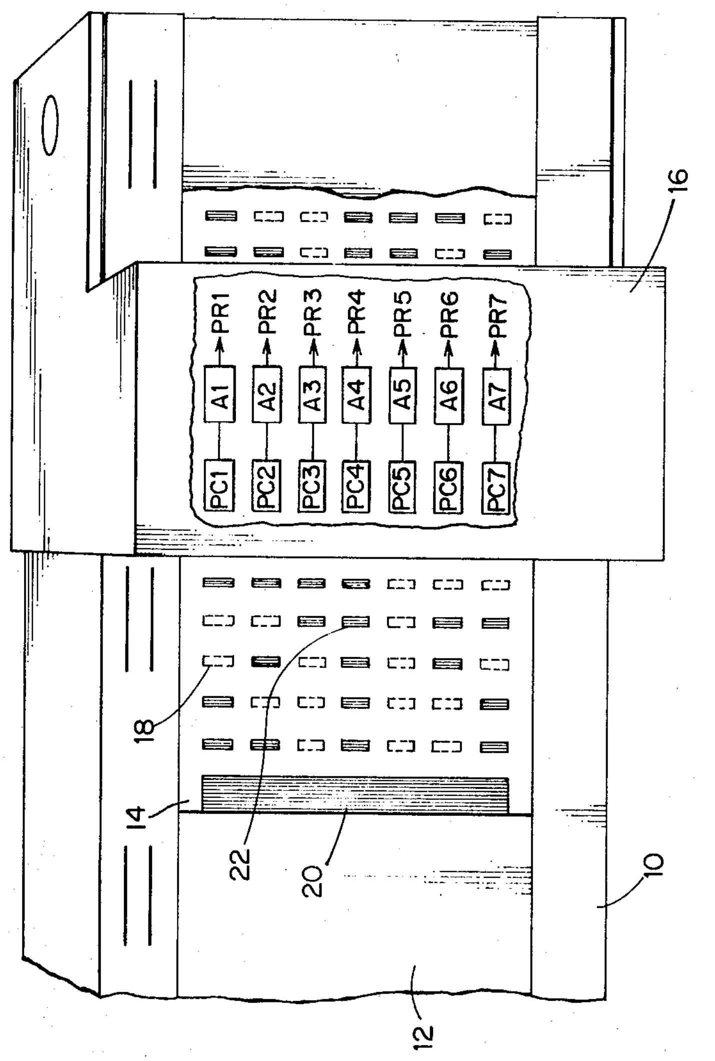
FIG. 1 is a schematic representation of a card and sensing head which may be used with the instant invention.

FIG. 1 shows portions of a card reader of the type which may employ the invention of the instant disclosure. A card reading station is shown generally at 10, the card reading station having a recess at 12 into which a card to be read is placed. Means, not shown, are used to drive a card 14 past a reading head illustrated partially schematically at 16. The card 14 may have a heading portion onto which operator readable information, not shown, may be placed. The remainder of the card contains a plurality of rows and columns of marks which may be filled in by an operator to form a darkened rectangle. The card shown in FIG. 1 contains 7 such rows which may form any desired number of columns across the length of the card.

At the leading edge of the card is a shaded portion 20 which is utilized for checking the operation of the photo cells and for setting the reader logic to prepare for reception of data which is encoded onto the card. The darkened portion 20 may be of predetermined density in order to establish a minimum readable threshold darkness for the data encoding portion of the card.

The data is entered onto the card by darkening various combinations of encoding spaces using a standard binary code. A center track 22 is a timing track or clock track and all columns of the card will have the center row darkened. The remaining six tracks, three above and three below the timing track, will contain the data which is to be read by the device.

The reading head 16 contains a plurality of photocells PC1 through PC7 to sense the data encoded on the card in tracks 1 through 7 respectively. The outputs of the photocells PC1 through PC7 are fed to amplifiers A1 through A7, respectively, which amplify and shape the photocell outputs to produce output signals PR1 through PR7. Obviously it is not necessary that the amplifiers form a part of the reading head. They may be remotely located, for example on a logic card, and merely connected by wires to the photosensitive devices. The photosensitive devices may be photodiodes, phototransistors, or other sensing devices.

FIGS. *2a* and *2b* are logic block diagrams of the checking and strobing circuits of the invention. FIG. *2a* generally shows the amplifier or track testing logic and FIG. *2b* shows generally the data transfer and strobing logic.

In reading the following description of FIGS. *2a* and *2b*, it may be helpful to refer to FIG. 3 which is a timing diagram showing the operation of the system.

In FIG. *2a*, a pair of AND-gates 30 and 32 are used to AND together the signals of the six data tracks PR1–PR3 and PR5–PR7. The third AND-gate 34 is connected such that the clock track signal PR4 is ANDed with itself, then amplified in amplifier 36 to produce a clock signal PRC10. The outputs of AND-gates 30 and 32 are amplified by amplifiers 38 and 40 respectively, and the outputs of all three amplifiers 36, 38 and 40 are in turn ANDed by gate 42 to produce a signal DK210 which will indicate that all seven channels (six data and one clock) have received a dark signal. Throughout this description, it is assumed that the amplifiers A1 through A7 in FIG. 1 are phased such that a darkened space on the card produces a high output.

In a similar manner, signals PR1–PR3 and PR5–PR7 are each ANDed with themselves by AND-gates 46 through 56 and the outputs of pairs of the AND gates are inverted by inverters 58, 60 and 62. Clock signal PRC10 is applied through a further AND gate 64 and inverted by inverter 66. The outputs of inverters 58, 60, 62 and 66 are in turn ANDed together in gate 68 and amplified in amplifier 70 to produce a signal LC110 which will appear when all channels, including the clock channel, sense a "light" code on the card (i.e., the absence of dark codings).

When a card is inserted into the card reader, a switch is tripped to produce a high signal XSW1X. XSW1X is ANDed with itself in AND-gate 72 and amplified by amplifier 74 to produce a signal XSW10, which will be high anytime a card is present in the reading device. XSW10 in turn is ANDed with itself in gate 76 and inverted by inverter 78 to produce XSW20, which is the negation of XSW10. Therefore, any time XSW10 is high, XSW20 is low and vice versa.

LC110 is ANDed with FF110 in gate 80 and when both signals are high, the output of gate 80 is amplified by amplifier 82 to produce a signal FF210. FF210 is ANDed with itself in gate 84 and inverted by inverter 86 to produce FF220, the negation of FF210; thus, while FF210 is a normally low signal and is raised upon LC110 and FF110 being in a high state, FF220 is a normally high signal which is lowered upon the presence of LC110 and FF110 in a high state. Since FF220 is normally high, when DK210 goes high AND-gate 88 will produce an output which is amplified by an amplifier 90 to product FF110. As soon as FF110 goes high it is ANDed as previously indicated with LC110 in gate 80 to produce FF210 in a high state.

With FF110 high and XSW20 low as a result of the presence of a card in the reader, XSW20 through AND-gate 92 the output of which is ORed with the output of gate 94 and inverted in inverter 96 will produce DK310 in a high state. With DK310 high and FF110 high, AND-gate 98, the output of which is ORed with AND-gate 88 is amplified in amplifier 90 to latch FF110 in a high state until DK310 goes low. DK310 will remain high, however, until DK210 again goes high indicating the presence of a dark signal on all seven channels. The presence of dark signals on all channels may, therefore, be used as a stop code for the device, since the data transfer logic will be inactivated upon receipt of a second "all channels dark" code. The first "all channels dark" code is derived from the dark bar 20 across the leading edge of the card, and is used to "arm" the device.

With the present of a high FF110, which is now latched, AND-gate 80 will be activated to produce high at its output which is amplified in amplifier 82 to produce a high FF210 as previously discussed. As soon as FF210 goes high, XSW10 which was brought high upon insertion of a card into the reader, and FF210 are ANDed together to produce a high output at gate 100 to latch FF210 in a high state. Obviously, FF220 will be effectively latched in a low state.

Figures 2A, 2B:
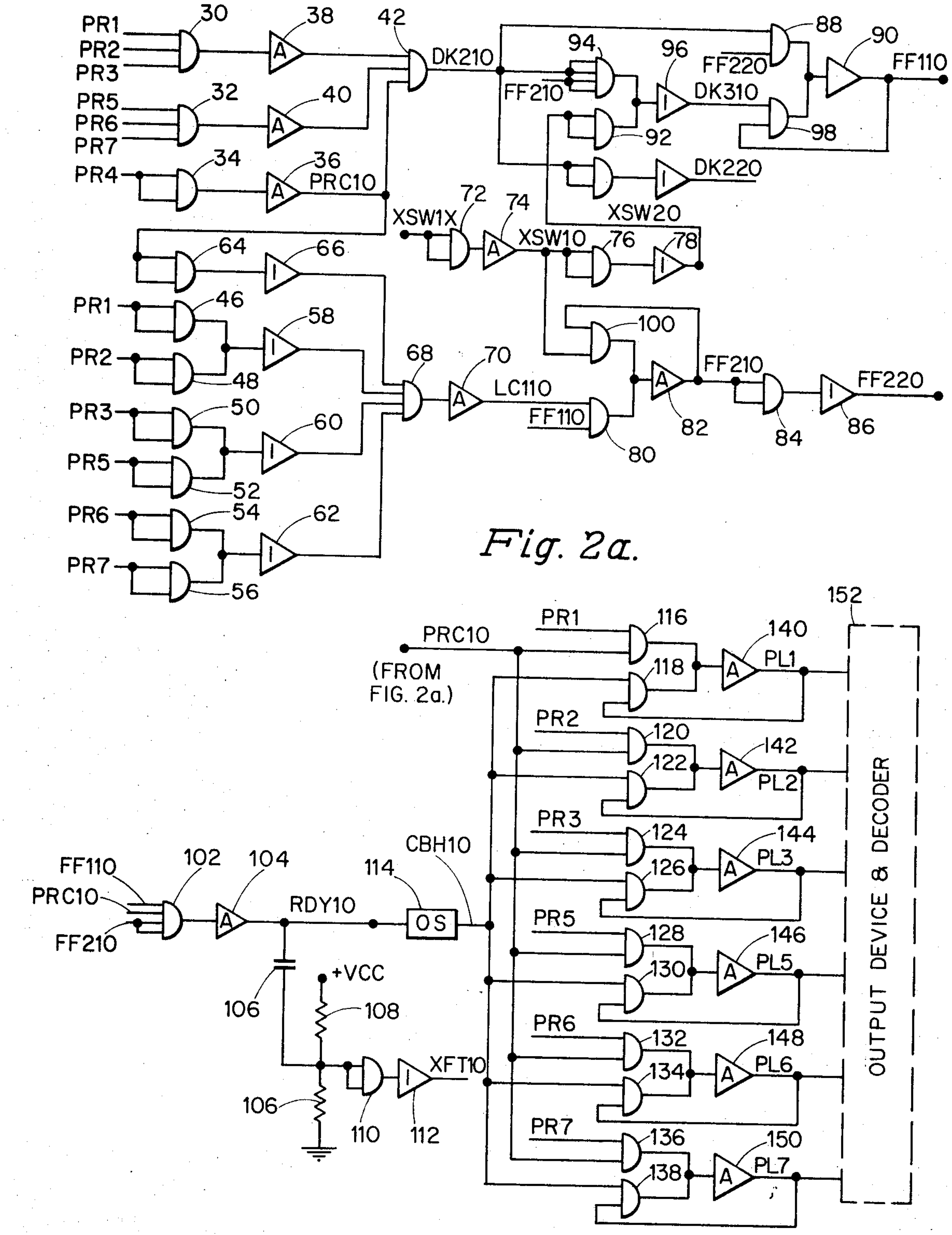

With FF110 and FF210 both latched high, AND-gate 102 in FIG. 2*b* will be activated at each PRC10 or clock signal. Since the clock channel will go high at each data column, the output of amplifier 104, RDY10, will now go high each time the clock goes high. The signal RDY10 is differentiated by a capacitor-resistor network 106 to produce positive and negative spikes on the leading and trailing edges of RDY10. A further resistor 108 is tied to a positive voltage source VCC to bias the differentiating network such that the output of AND-gate 110 and inverter 112, XTF10, produces a positive pulse only on the trailing edge of RDY10. The signal XTF10 will be used to strobe data into an output device as will be discussed later.

RDY10 is further applied to the input of a one-shot 114 to produce a signal CBH10 which is merely RDY10 slightly extended. The extended signal CBH10 will allow recirculation of the output register until data is transferred to an external device. Upon the resetting of CBH10, the output register will be cleared and ready to accept the NEXT frame of information to be transferred into the output register.

The output register consists of a plurality of AND-gates 116 through 138, successive pairs of the AND gates being associated with amplifiers 140 through 150, respectively.

PRC10 (the clock signal from FIG. 2*a*) is applied to one terminal of each pair of AND gates as shown in FIG. 2*b*. PRC10 is ANDed with each of the data track signals PR1–PR3 and PR5–PR7. When a clock pulse and data pulse are present on any channel, its respective AND gate is activated to produce a high output which is amplified by its associated amplifier to produce output signals PL1–PL3 and PL5–PL7, respectively. As the output (PL) signal is generated, the presence of CBH10 as an input to the second of each pair of AND gates will cause the amplifier network for that channel to latch, thereby preserving the PL signal for an extended period of time as may be seen in FIG. 3.

With an output signal now appearing on one or more of the outputs, the previously generated strobe XTF10 may be used to activate the output device or decoder 152 to accept data from the data lines. The output device 152 may be a conventional register and will have a clearing mechanism which is also conventional. The output device may also include a decoder which may, for example, recognize an all dark data word as a stop code. The strobe XTF10 may be used, as previously indicated, for transferring data into the output device, or, alternatively, by synchronizing with a timing generator in the output or utilization device, to synchronously strobe data from the output device and the coder to its ultimate point of use. These functions may be performed by conventional means, not shown.

OPERATION OF THE DEVICE

In the operation of the device, reference may additionally be made to FIG. 4 which shows a flow diagram of the operation of the device.

The reading operation is begun by inserting a card to be read in an appropriate location on the card reader, the card then being fed under the reading head where the card markings are sensed. Upon placing a card in the reading position, a switch is tripped generating XSW10 (FIG. 2*a*).

The operation of all amplifiers is then checked by generating an "all dark" check. A solid dark bar extends across the tracks on the leading edge of the card. When the dark bar comes under the read head, signals will be generated from the channel amplifiers to produce signals PR1–PR7. These signals are ANDed together as previously described to produce signal DK210 which is the "all dark check complete" signal. When the all dark check has been completed, the card advances to a light portion before the data tracks start to appear. By ANDing together and inverting the signals PR1 through PR7, a "light check" signal LC110 is generated. As previously discussed, the all dark check DK210, plus FF220 (an initially high signal) are ANDed together to produce FF110. When the light check has been completed, LC110 and FF110 are ANDed together to produce FF210 and FF220. As previously described, FF110 and FF210 are latched upon their creation and will remain high until the end of the card or until a stop code is received. In FIG. 2*b* it can be seen that the presence of FF110 and FF210 together with clock channel PRC10 will produce the RDY10 signal each time the clock channel senses a clock marking which is present in each data column of the card, RDY10 in turn produces XTF10 on its trailing edge and CBH10 as previously discussed. In FIG. 4, it can be seen that after the dark check and light check the "ready," RDY, function will be turned on, and on the next clock the data strobing window will open and data will be latched into the output register awaiting a data transfer pulse XTF10. The clock channel, after passing the clocking mark on the card will turn off, thus lowering RDY10 to produce the data strobe XTF10. If an end of program code has not been sensed the clock channel will again go high and the next data character will be strobed into the data output registers and held by CBH10 as previously discussed.

As has been noted, an all dark code is, in addition to being the "arming" code to set the logic in preparation for the reception of data, an end code. When an operator is coding a card to be read, a heavy black line may be drawn across the card at the point where data ends in order to stop the reader sensing logic short of the end of the card. When all channels appear dark in this case, DK210 will again be set and DK210 together with FF210 will raise the output of AND-gate 94 which is inverted in inverter 96 to lower the signal DK310 and unlatch FF110. When FF110 is lowered, RDY10 no longer will be generated, nor will XDF10 or CBH10. Thus, although data may still be transferred to the output register (amplifiers 140 through 150) a strobe will not be generated to transfer the data to the output device. When the end of the card is reached, the microswitch XSW will be released, thus unlatching FF210 by lowering one terminal of AND-gate 100.

While, in accordance with the provisions of the statutes, there has been illustrated and described the best form of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. In a mark sense card reader for sensing marks in a plurality of channels:

a. light emitting means for each of said channels, b. light sensing means for each of said channels responsive to said light emitting means, c. first means responsive to said light sensing means for indicating the presence of particular markings in a group of said channels, d. second means responsive to said light sensing means for indicating the absence of said markings in a group of said channels, e. third means for inhibiting reading of said channel marks in the absence of indications by said first or second means and for allowing reading of said channel marks in the presence of indications from both said first and said second means, and f. fourth means for inhibiting further reading of said channel marks in the presence of further particular markings.

2. A device as set forth in claim 1 wherein said first, second and third means are logic means.

3. A device as set forth in claim 2 wherein said third means is an AND gate.

4. In a record reading device for sensing indicia on a medium:

a. means for producing a first signal in response to the sensed presence of particular indicia on said medium, b. means for producing a second signal in response to the sensed absence of particular indicia on said medium, c. means for inhibiting reading of further indicia in the absence of said first or second signal and for allowing reading of further indicia in the presence of both said first and said second signal, and d. means for inhibiting further reading of said indicia in the presence of further particular indicia.

5. A device as set forth in claim 4 wherein said means for inhibiting is an AND gate.

6. In a mark sense card reader for sensing markings on a card, said markings arranged in a plurality of channels:

a. a card having a plurality of rows and a plurality of columns, 1. one of said rows having clock indicia at each of said column positions,
2. said card having a signal bar at one edge thereof, b. logic means for producing a first signal in response to sensing the presence of said signal bar, c. logic means for producing a second signal in response to sensing the absence of said signal bar, d. means for sensing said clock indicia and for generating a third signal in response thereto, e. means responsive to said first, second, and third signals for gating data represented by indicia in the other of said plurality of channels, to an output means, f. a second signal bar at another position on said card, and g. means responsive to said second signal bar to inhibit said means responsive to said first, second and third signals.

7. A device as set forth in claim 6 wherein the absence of said first or second signal inhibits the gating of said data to said output means.

8. A device as set forth in claim 6 wherein said means responsive to said first, second and third signals represents an AND function.

9. A device as set forth in claim 6 wherein said second signal bar is the same as said first signal bar and is located at a position intermediate said one edge and a parallel edge.

10. A device as set forth in claim 6 further comprising means for generating a pulse in response to said third signal for gating said data to said output means.

* * * * *

PO-1050
(5/69)

UNITED STATES PATENT OFFICE
CERTIFICATE OF CORRECTION

Patent No. 3,654,534 Dated April 4, 1972

Inventor(s) Ronald S. Fischer

It is certified that error appears in the above-identified patent and that said Letters Patent are hereby corrected as shown below:

In the Abstract:, line 3, "changed" should be --charged--;

Column 3, line 4, "duct 38" should be --duct 28--;

Column 6, line 57, "paltes" should be --plates--;

Column 6, line 57, "lower" should be --higher;

Column 6, line 58, "like" should be --life--

Signed and sealed this 5th day of September 1972.

(SEAL)
Attest:

EDWARD M.FLETCHER,JR.
Attesting Officer

ROBERT GOTTSCHALK
Commissioner of Patents